INVENTORS
R. J. De Feo, R. P. Cahn, J. M. Carr, Jr.,
R. B. Long, T. L. Cappel, R. Cecchetti BY Joseph P. Burke

PATENT ATTORNEY

Nov. 19, 1968  R. J. DE FEO ET AL  3,412,172
RECOVERY OF HIGH PURITY BUTADIENE BY CUPROUS SALT PARTICLES
IN ALL-SLURRY PROCESS
Filed Sept. 19, 1966  2 Sheets-Sheet 2

INVENTORS
R. J. De Feo, R. P. Cahn, J. M. Carr, Jr.,
R. B. Long, T. L. Cappel, R. Cecchetti BY Joseph P. Burke

PATENT ATTORNEY

United States Patent Office 3,412,172
Patented Nov. 19, 1968

3,412,172
RECOVERY OF HIGH PURITY BUTADIENE BY CUPROUS SALT PARTICLES IN ALL-SLURRY PROCESS
Richard J. De Feo, Baton Rouge, La., Robert P. Cahn, Millburn, N.J., Jesse M. Carr, Jr., Baton Rouge, La., Robert B. Long, Atlantic Highlands, N.J., Thornton L. Cappel, Baton Rouge, La., and Ralph Cecchetti, Hanover, N.J., assignors to Esso Research and Engineering Company, a corporation of Delaware
Filed Sept. 19, 1966, Ser. No. 580,436
41 Claims. (Cl. 260—681.5)

ABSTRACT OF THE DISCLOSURE

Recovery of high purity butadiene by liquid phase slurry complexing is conducted with an active cuprous halide sorbent slurried in a paraffin-containing organic diluent, followed by slurry stripping and desorption of complexed butadiene in the presence of the diluent.

Figure 1:
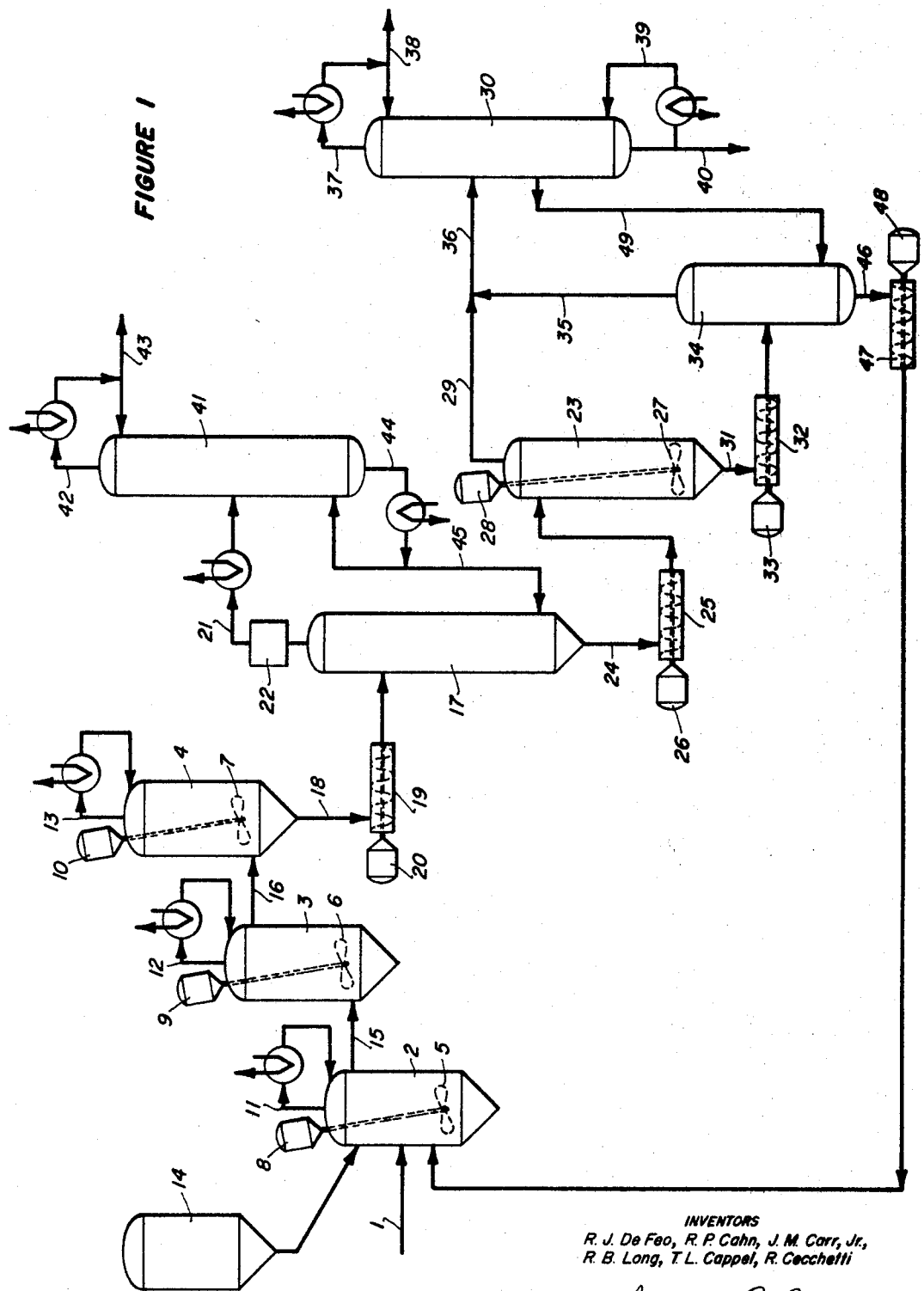

The present invention is directed to an improved process for separating 1,3-butadiene from hydrocarbon streams containing it by use of cuprous halide sorbents. Refinery hydrocarbon streams containing 1,3-butadiene are mixtures composed largely of $C_4$ components. Such $C_4$ streams contain, in addition to the valuable 1,3-butadiene, close boiling $C_4$ monoolefins (e.g. butene-1, butene-2, isobutylene) and butanes, which are less valuable and very difficult to separate from 1,3-butadiene by straightforward distillation procedures.

More specifically, this invention is directed to an improved process for separating and recovering 1,3-butadiene in high yields and purity from hydrocarbon streams containing it in admixture with close boiling components by a process involving in its essential embodiments: (1) contacting (A) a 1,3 - butadiene-containing hydrocarbon stream, with (B) a fluid slurry of solid, sorption-active cuprous halide sorbent particles selected from the group consisting of cuprous chloride, cuprous bromide and cuprous iodide and having a porosity above about 10% (of the volume of a particle) 550 to 10,000 A. pores in an inert, essentially anhydrous organic liquid slurry medium containing an extraneous liquid, inert paraffin diluent material which (a) is essentially inert to reaction with said cuprous halide sorbent particles, (b) has a boiling point higher than 1,3-butadiene, $C_4$ monoolefins and $C_4$ paraffins (contained in the 1,3-butadiene-containing feedstream), and (c) has a boiling point at operating pressures lower than that temperature at which said cuprous halide sorbent particles deactivate significantly (i.e. by annealing to reduce significantly porosity, sorptive capacity and activity) with the proviso that paraffin(s) can be employed satisfying requirements (a) and (b) but, per se, having a boiling point at and higher than said deactivation temperature provided that said paraffin(s) are employed in the presence of an inert boiling point depressant material(s), e.g., nitrogen, hydrogen, natural gas, light paraffin in the $C_5$-$C_7$ range, etc. (any inert gas essentially free of oxygen), which lowers the boiling point of said paraffin to one below said sorbent deactivation temperature (at operating pressures), at temperature and pressure conditions sufficient to effect liquid phase formation of a solid, insoluble cuprous halide-1,3-butadiene complex preferentially, (2) stripping from said solid sorbent particles and liquid slurry medium uncomplexed materials and materials less preferentially complexed than 1,3-butadiene while maintaining a liquid slurry of solid 1,3-butadiene-cuprous halide particles in said inert, essentially anhydrous liquid paraffin diluent material, and (3) desorbing said complex preferably substantially in the absence of $C_4$ monoolefins while maintaining a liquid slurry of solid cuprous halide (desorbed) solids in said inert, liquid paraffin diluent. Any $C_4$ or lighter monoolefins sorbed upon the cuprous halide sorbent particles during sorption stage (1) are removed from the complexed particles by stripping stage (2) prior to desorption (3) of the 1,3-butadiene therefrom.

According to one of the preferred embodiments of this invention, the preferential liquid slurry phase complexation (1) is conducted in a plurality of slurry contacting steps with each succeeding contacting step being conducted at a lower temperature than the preceding one, all slurry contacting steps being conducted in a liquid phase using a slurry of solid sorption-active cuprous halide sorbent particles having the above-described porosity. The use of progressively lower contacting (complexing) temperatures in succeeding slurry complexing steps promotes higher 1,3-butadiene recovery and allows efficient utilization of expensive refrigeration.

Certain prior art olefin separation processes for removing 1,3-butadiene from dilute refinery $C_4$ olefin feed streams containing it are based on vapor phase selective complexing of the 1,3-butadiene followed by decomplexing to recoup the separated 1,3-butadiene. Although some of these processes employ cuprous halide sorbents having high activity for 1,3-butadiene sorption (produced by specific cuprous halide sorbent preparation procedures), these prior art processes often require at least several complexation stages to be conducted, each complexing stage being conducted in a separate fixed or fluidized complexing bed in the vapor phase due to the highly exothermic nature of the complexation reaction and the slow vapor phase reaction rate involved. In turn, each complexing bed must be internally cooled using a large number of cooling tubes internally disposed within each complexing bed to remove the heat of reaction. These tubes, of course, periodically require maintenance, cleaning, etc., to prevent complex bed reactor fouling. Moreover, such prior art procedures require a large inventory of cuprous halide sorbent compared with the process of this invention since each vapor phase complexing bed must contain sufficient sorbent to insure the attainment of quantitative goals.

Moreover, it has been noted in conjunction with vapor phase sorption procedures that the cuprous halide sorbent is subjected to fairly rapid loss of capacity. Consequently, the once sorption-active cuprous halide sorbent must be reactivated on a fairly continual basis, which increases the cost of conducting vapor phase fixed or fluidized bed 1,3-butadiene separation and recovery procedures. Thus, these conventional prior art vapor phase processes are very expensive, due to the necessities of regenerating the capacity of the sorbent, maintaining conventional internal refrigeration, and maintaining a large inventory of cuprous halide sorbent particles throughout processing. These increased capacity regeneration, apparatus, refrigeration and inventory costs plus maintenance costs due to depositing and coating of complex particles on the cooling tubes, detract significantly from the economic incentive of high purity product 1,3-butadiene otherwise offered by such prior art processes.

Certain other prior art olefin separation processes for recovering 1,3-butadiene from dilute refinery $C_4$ olefin feed streams are based on liquid phase injection of the feed into a fluidized bed or transfer line of cuprous halide followed by vapor phase decomplexing and drying of the sorbent particles. These processes ordinarily suffer from packing (agglomeration) of the sorbent particles to such an extent that cement mixer type apparatus, scrapers, etc., are often required both in the complexing and decomplexing steps thereby resulting in much reduced activity of the sorbent particles. Also, of course, complete separation of the uncomplexed material from the complex cuprous chloride so as to obtain pure product is extremely difficult. In such procedures, while the complexing is done in the liquid phase, the stripping and decomplexing are frequently accomplished in the gaseous phase, and the cuprous halide sorbent particles must be deliquefied and throughly dried (to insure adequate regeneration of the sorbent activity) prior to reuse to accomplish further complexing.

It is surprising that the present invention which employs an all slurry process (liquid phase slurry complexing followed by slurry stripping and slurry decomplexing) does not require regeneration of the sorptive capacity of the sorbent particles. Nor is it required (or even desirable) to deliquefy and dry the desorbed sorbent particles prior to recirculation to the slurry complexing stage. In fact, the liquid phase complexing, slurry stripping, and slurry desorption have the distinct advantage that they can increase the sorptive capacity of the sorption-active cuprous halide sorbent particles, e.g., when the sorbent particles have less than the desired high sorptive capacity at the outset of a process. That is to say, the present inventors have noted a distinct increase in sorptive capacity of the cuprous halide sorbent particles even on a once-through basis through the complete complexing, stripping and desorption procedure. This in situ activation advantage is so pronounced that the process can even start up with raw cuprous halide salt, which will be converted to active sorbent having the above-defined porosity simply by repeated sorption-desorption cycling.

Another surprising advantage of the process of this invention compared with prior processes resides in the ability of the instant process to reject essentially all methyl and ethyl acetylenes from the product 1,3-butadiene. Also, the present process reduces the vinyl acetylene content in the product 1,3-butadiene to a level considerably below that present in the feedstream thus demonstrating a substantial process rejection of the troublesome vinyl acetylene.

The present invention effectively overcomes the above-mentioned drawbacks previously encountered in prior art procedures and constitutes a highly advantageous and economical solution to those and other problems encountered in such prior art 1,3-butadiene separation and recovery processes. Moreover, the present invention reduces the investment, apparatus requirements, refrigeration, drying and maintenance costs.

Furthermore, the all slurry process of the present invention is capable of achieving 1,3-butadiene recoveries of 95+ wt. percent and 1,3-butadiene product purities of 95.5+ percent in the recovered product. According to a preferred embodiment of this invention, 1,3-butadiene product purities of 99.7 to 99.9+ wt. percent can be achieved readily. The use of nearly ambient temperatures in the initial stage(s) of complexing minimizes costs of cooling and heating compared with the previously known vapor phase processes for separating and recovering 1,3-butadiene. The present invention also avoids such problematic drawbacks as bogging, which can present quite a problem in vapor phase reaction (complexing) procedures. Also, close particle size control of the cuprous halide sorbent particles is not required with the present invention. Usually, however, cuprous halide sorption-active sorbent particles are used which are less than 200 microns in size in order to facilitate stirring the slurry and pumping the slurry throughout the 1,3-butadiene separation and recovery system. The process of the present invention is much simpler to operate than either the "vapor phase complexing" or "liquid phase complexing-vapor phase stripping and desorbing" prior art procedures because the sorbent solids do not have to be dried to restore their sorptive capacity. In fact, as noted hereinabove, it is the distinct and unexpected advantage of this invention that the cuprous halide sorbent particles maintain and even enhance their activity by undergoing pronounced in situ activation during the slurry complexing steps.

Figure 2:
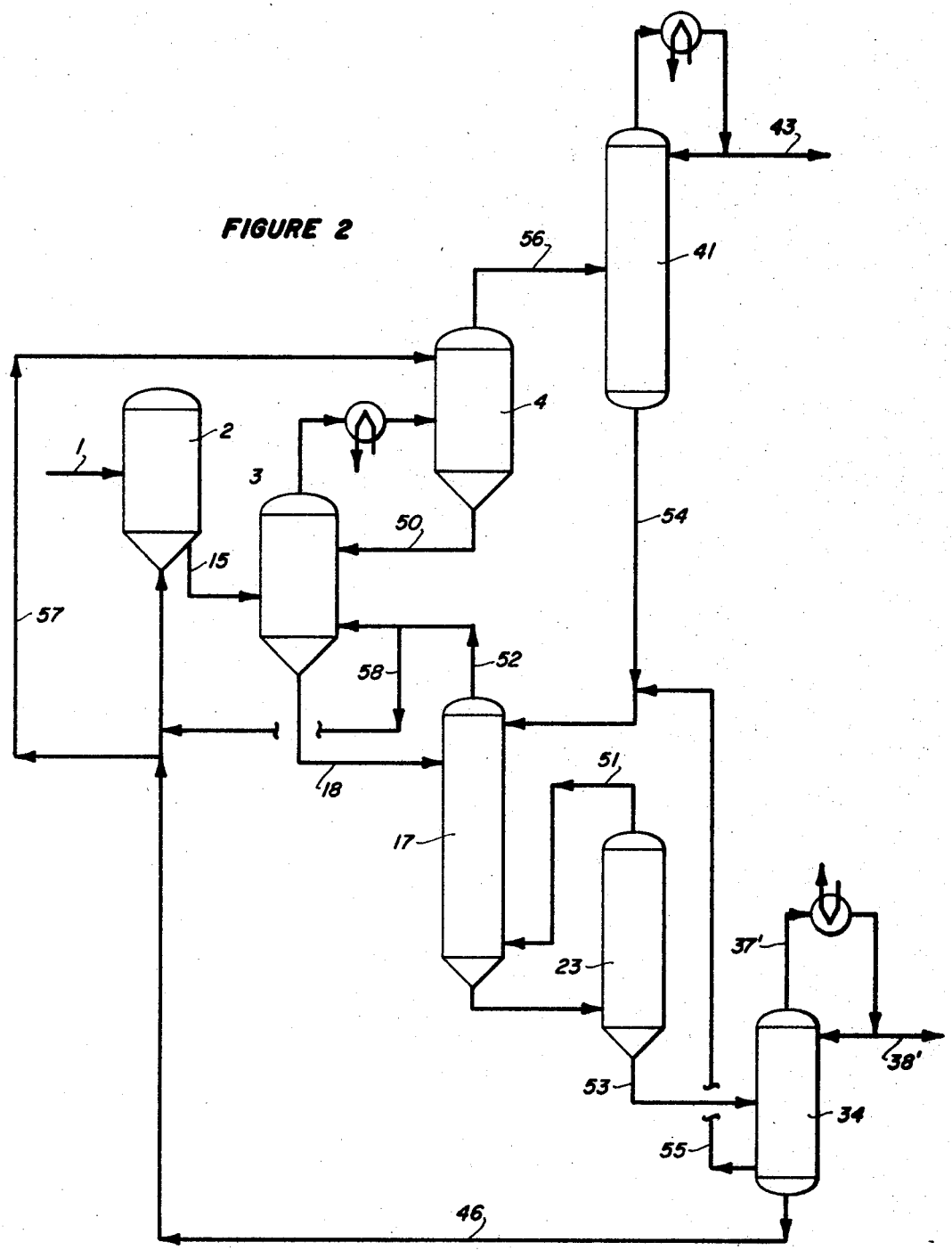

These and other advantages of the present invention will be apparent from the description which follows:

FIGURE 1 of the drawing is a plan view of the all slurry 1,3-butadiene separation and recovery process of this invention. FIGURE 2 is also a plan view illustrating the overall separation and recovery process but with some variations from that of FIGURE 1. The FIGURE 2 drawing illustrates the use of a $C_6$ or higher boiling diluent-based 1,3-butadiene recovery, e.g., heptane. In both FIGURES 1 and 2 an inert liquid hydrocarbon diluent heavier than the $C_4$ feed is used. In the procedure noted in FIGURE 1, diluent vapors are used to strip contaminant butenes from the slurry prior to decomplexing. This necessitates a light diluent such as n-pentane, iso-pentane, or isohexanes, and low temperatures and pressures in the butene stripping. It should also be noted that product butenes can be withdrawn as the overhead vapors from butene stripper 17 (FIGURE 1) or final complexing reactor 4 (FIGURE 2). In FIGURE 2 the product butadiene vapors are used to strip the butenes from the slurry. This prevents decomplexing in the stripper and allows use of heavier diluents and comparatively high temperature operation in the stripper. However, in view of the use of butadiene as stripping vapor in FIGURE 2, higher slurry circulation is used with the FIGURE 2 procedure than is employed in that of FIGURE 1.

FIGURE 1 illustrates a continuous, all slurry butadiene separation and recovery system employing, e.g., a $C_5$ (pentane) paraffin diluent and liquid phase slurry complexing, slurry stripping, and slurry decomplexing. In the drawing, the 1,3-butadiene-containing feedstream 1 composed of 1,3-butadiene, butenes and butane(s) is fed to the first liquid phase slurry complexing vessel 2 of the plurality of such vessels 2, 3 and 4. Each such vessel is equipped with stirrer assemblies 5, 6, and 7, respectively, driven by motors 8, 9 and 10, respectively. Each complexing vessel contains solid, sorption-active cuprous halide sorbent particles slurried in n-pentane. The 1,3-butadiene-containing liquid feedstream in contacting these particles, forms solid cuprous halide-1,3-butadiene complex particles which are insoluble in the slurry medium (then composed of $C_5$ paraffin diluent and liquid $C_4$ feedstream). After a suitable residence period in complexing vessel 2, the slurry is passed preferably continuously via line 15 to complexing vessel 3 and, in turn, via line 16 to complexing vessel 4. The average residence times of the slurry in each complexing vessel depends on the size of the vessel and the liquid and solid feed rates. Complexing vessels 2, 3 and 4 can be provided with internal recycle systems indicated at 11, 12, and 13, respectively, to condense and recycle any gases produced (due to the exothermic complexation reaction) back into the liquid phase complexing reaction zones. Alternatively (but less preferably) internal coolers or pumparound cooling systems can be provided to remove this heat, in which case the complexing reactors would operate above the vapor pressure of the liquid. Sorbent supply tank 14 serves as a reservoir from which make-up cuprous halide sorbent can be added to complexing vessel 2 as needed. Also, it can be used to feed sorbent particles to vessel 2 at the startup of the 1,3-butadiene separation and recovery campaign.

From the last of the liquid phase complexing vessels, e.g., vessel 4 of the drawing, the slurry of complexed sorbent solid particles, containing the separated (sorbed) 1,3-butadiene as the cuprous halide-butadiene complex, is conveyed to butene stripper 17 via delivery line 18 and slurry pump 19 equipped with motor 20. While three complexing vessels have been indicated in the drawing, it should be clearly understood that less than 3 complexing vessels, e.g., one or two such vessels, or more than three, e.g., four or more, can be utilized. According to a preferred embodiment of this invention, however, three such liquid phase slurry complexing vessels are employed in a continuous process. The number of complexing vessels, i.e., stages, to be used depends largely upon the recovery level sought, the specific feedstream from which the budadiene is recovered and prevailing cooling water temperatures, thus, e.g., with a concentrated feed (50+%  budatiene-1,3) and low cooling water temperatures (75° F. or less), a single complexing stage is sufficient to recover 95% or less of the butadiene present. However, two or three stages of slurry complexing are advisable when handling feeds containing 20 to 40% butadiene-1,3 to achieve higher recoveries thereof, e.g., 96-98+%.

In butene stripper 17, the butenes and a portion of the pentane (or other) inert, liquid diluent are stripped from the complexed sorbent particles in a slurry stripping operation (with the complexed sorbent still slurried) prior to liquid phase decomplexing of said particles. Butene stripper 17 is equipped with a condenser system 21 which can include one or more compressors 22 to provide reflux for the stripper and to allow high pressure operation of the butene-diluent splitter. The overhead gas from tower 17 can be condensed with cooling water or refrigeration and pumped to the following processing step.

The stripped butene gas, including some inert pentane diluent is then passed to a butene-paraffin diluent splitter 41 which separates the butene(s) as an overhead product to the butene take-off line 43 from reflux condenser system 42. The paraffin diluent fraction is taken as a bottoms product from the reboiler system 44 via line 45 and can be recycled to butene stripper 17 as shown in FIGURE 1 of the drawing.

An alternate method of removing the butene contaminant from the slurry is by countercurrent extraction wherein the pure diluent is contacted countercurrent to the slurry to extract or wash the slurry free of contaminants. In a laboratory test, washing of the slurry with n-pentane was shown to give product 1,3-butadiene purity equivalent to that from stripping the slurry with 1,3-butadiene gas.

Stripped, complexed cuprous halide sorbent particles as a slurry in liquid paraffin diluent are withdrawn as a bottoms stream from butene stripper 17 via delivery line 24 which includes slurry pump 25 driven by motor 26, and conveyed to slurry decomplexer vessel 23. Decomplexer 23 is equipped with stirrer assembly 27 driven by motor 28. It is in this slurry decomplexing vessel that the major (significant) portion of the butadiene recovery (desorption) takes place. The terms "slurry complexing," "slurry stripping," "slurry decomplexing," and like terms, as used herein, are employed to indicate a slurry of solid cuprous halide complexed or uncomplexed particles in inert liquid diluent wherein the solid particles are surrounded by a contiguous liquid inert diluent during complexing, stripping and decomplexing. The raw product 1,3-butadiene is taken as an overhead stream via take-off line 29 and passed to 1,3-butadiene inert diluent splitter 30 via line 36.

The substantially decomplexed cuprous halide sorbent particles are then carried as a decomplexed slurry via lines 31 and slurry pump 32 (driven by motor 33) to 1,3-butadiene stripper 34 to remove additional amounts of 1,3-butadiene primarily from the inert liquid diluent. The thus stripped 1,3-butadiene is taken off at line 35 and passed to 1,3-butadiene-inert diluent splitter via line 36. The decomplexed stripped slurry of cuprous halide sorbent particles is then recycled via line 46 and slurry pump 47 (driven by motor 48) to liquid phase complexing tank 2 for further use in separating and recovering 1,3-butadiene.

Another method for operation of the process includes integrated heat exchange of the various slurry streams in the system. An example of such integrated heat exchange is the cooling of the slurry from the decomplexer in return line 46 by direct slurry heat exchange with the slurry in line 24 which is heated during the exchange by the slurry in line 46, which is cooled.

The highly purified, separated, and recovered product 1,3-butadiene is taken from splitter 30 as an overhead product stream 38 from condenser system 37. The inert liquid diluent (e.g., pentane) stream containing some 1,3-butadiene dimer is taken off via line 40 in conjunction with reboiler system 39. Some pentane diluent vapor can be taken off splitter 30 via line 49 and recycled to 1,3-butadiene stripper 34.

Another preferred embodiment of this invention is shown in FIGURE 2. In this specific case n-heptane is the liquid inert paraffin diluent. Of course, other liquid diluents higher boiling than the $C_4$ feed can be used. 1,3-butadiene is used for stripping the butene impurities from the slurry prior to decomplexing. The complexation is again carried out in the same manner in a plurality of complexation stages. The complexing in reactor 2 is carried out at temperatures of 80–140° F., e.g. 105° F., and in reactor 3 at 60–100° F., e.g., at 80° F. Vapors from reactor 3 can be condensed and fed to low temperature complexer 4 for final butadiene-1,3 cleanup at complexing temperatures of 40–70° F., e.g., 60° F. The complexed slurry from the final low temperature stage 4 is returned to the previous complexation stage by line 50 and the combined, complexed absorbent in the slurry media in tank 3 is transferred to the butene stripper 17 via line 18. Some of the 1,3-butadiene, together with some diluent vapors from the decomplexer 23, are returned as vapor to the stripper 17, via line 51 for use in stripping the slurry of contaminants. The contaminants and a portion of the stripping vapors are returned to the complexation section 2 or 3 via lines 52 or 58.

The slurry containing diluent, 1,3-butadiene, and decomplexed sorbent is transferred from the decomplexer-reboiler 23 to the combination 1,3-butadiene $C_7$ diluent splitter 34, via line 53. This splitter tower separates the 1,3-butadiene product (which is removed from the process by lines 37' and 38') from the $C_7$ diluent and decomplexed sorbent which are recycled to the complexation section via line 46. Some diluent $C_7$ can be returned from the butene/$C_7$ splitter 41, to the butene stripper 17, via line 54. Fresh decomplexed slurry can also be fed to the top of the butene stripper from the bottom of the 1,3-butadiene/$C_7$ splitter 34, via line 55. Fresh slurry from the bottom of splitter 34 is also fed to the low temperature cleanup reactor 4 via line 57. The butene contaminants are removed as vapor along with some $C_7$ diluent from the last stage of the complexation via line 56 to the butene/$C_7$ splitter 41. The butenes are removed from the process via line 43 from the butene/$C_7$ splitter.

At the outset of processing (startup) the 1,3-butadiene-containing feedstream containing primarily other $C_4$ materials including butanes and butene(s), along with the 1,3-butadiene, with small amounts of vinyl acetylene, methylacetylene, and ethyl acetylene (usually less than a total of 1.0 wt. percent of acetylenes) is fed via line 1 to the first liquid phase complexing vessel 2. The complexing vessels 2, 3 and 4 at the startup are provided with inert liquid diluent and sufficient sorption-active cuprous halide sorbent slurried to accomplish the complexing. Of course, one alternate way of starting up the process is to add the $C_5+$ diluent to the 1,3-butadiene-containing feed stream prior to feeding into the first complexing vessel 2. Of course, in such a procedure either all complexing vessels 2, 3 or 4 or only vessel 2 is provided with sufficient sorption-active cuprous active halide sorbent particles prior thereto. In any event a solids-liquid slurry is formed in vessel 2, which slurry is stirred to secure proper contact of the solid sorbent particles with the liquid slurry medium containing the 1,3-butadiene.

The liquid phase complexing in the first complexing vessel 2 can be conducted at temperatures ranging from 0 to 150° F. and pressures of from 5 to 100 p.s.i.a. (lbs.

per square inch absolute) or higher. Usually, this complexing will be conducted at temperatures of 70 to 140° F. and corresponding pressures of 15 to 75 p.s.i.a. The preferred complexing conditions under which the first liquid phase complexing is conducted are temperatures of about 80 to about 120° F. with corresponding pressure ranging from about 15 to about 70 p.s.i.a. As noted hereinbelow, the second and subsequent liquid phase complexing operations are conducted at temperatures lower than the first liquid complexing step.

It is desired to conduct as much of the complexation as possible in the first higher temperature complexation stage. As will be shown in examples below, complexation temperature affects product 1,3-butadiene purity, i.e., the higher temperature giving a more pure product. If a large portion (>60%) of the total complexation is done at the higher temperature, a higher purity product is obtained than if all the complexing is carried out at the lower "clean-up" stage temperatures. Also, by doing most of the complexation at the higher temperatures, cooling water can be used to maintain complexing temperatures. The use of water is considerably less expensive than refrigeration (necessary to cool to temperatures well below ambient). The more expensive refrigeration is then only required for the remaining amount of complexation done in the lower temperature stages.

Thus, the second stage of complexing, e.g., that occurring in vessel 3, can be conducted at temperatures of 0 to 110° F. (but lower than that of the first complexation operation) while using pressures of 5 to 70 p.s.i.a. Usually, however, the second complexing step is conducted at temperatures of about 25 to about 110° F. while employing pressures of about 7 to about 65 p.s.i.a. Preferably, the complexing operation of liquid complexing vessel 3 is conducted at temperatures of 40 to 100° F. at pressures ranging from about 15 to about 65 p.s.i.a.

The liquid phase complexing occurring in vessel 4 can take place at temperatures of about −20 to about 70° F. (but lower than the temperature employed in the second complexing tank). Usually this complexing occurs at temperatures of about −20 to about 65° F. at pressures of about 1 to about 30 p.s.i.a., and preferably occurs at temperatures of −10 to about 60° F. at pressures of about 2 to about 20 p.s.i.a. Of course, with respect to all of the liquid phase complexing operations whose conditions are set forth and detailed hereinabove; each such complexing step can be operated either at the listed temperature and pressures, or in the case of all-liquid operation at the listed temperatures and above the vapor pressure of the components. The complexing can be conducted at the listed temperatures and at the vapor pressures of the components in cases where an auto-refrigerated system is used.

As mentioned previously, the complexed cuprous halide sorbent must be stripped substantially free of butenes prior to decomplexation thereof. The butene stripping is accomplished in vessel 17. Preferably the stripping conditions at the top of vessel 17 are maintained at or below the decomplexing temperature of 1,3-butadiene with the cuprous halide sorbent employed at the partial vapor pressure of butadiene in the liquid portion of the slurry Preferably, the stripping conditions at the bottom of the butene stripper are oprated at temperatures and pressures no hotter than required to recycle that amount of inert diluent vapor which is required to reduce the butene level of the stripped slurry stream (liquids and solids) to from 0 to 5 wt. percent, e.g. in the FIGURE 1 embodiment. Alternatively the temperature in the bottom of the butene stripper should not exceed the decomplexing temperature of the complex in the slurry at the partial pressure of butadiene in the liquid portion of the slurry at the bottom of the tower.

As noted in FIG. 1, the stripped gas removed by butene stripper 17 is then conveyed to butene inert diluent splitter 41 wherein the butene and pentane fractions are separated. This separation can be conducted at temperatures of −5 to 150° F. and pressures of 5 to 115 p.s.i.a. at the top of the splitter. Usually the conditions at the top of the splitting column range from about 80 to 140° F. with accompanying pressures of 50 to 100 p.s.i.a. Preferably the top of the splitter column is operated at temperatures of 90 to 120° F. and pressures of 65 to 95 p.s.i.a. The bottom of butene-pentane splitter 41 is operated at temperatures of 65 to 300° F. and accompanying pressures of 10 to 120 p.s.i.a., more usually at temperatures of 140 to 200° F. and pressures of 55 to 105 p.s.i.a and preferably at temperatures of 150 to 190° F. and pressures of 80 to 100 p.s.i.a. Of course, while the above temperatures apply to the use of pentane as the inert liquid diluent; it is clear that the bottoms temperature will depend on the boiling range of the diluent and the pressures used.

In the processing scheme illustrated in FIG. 1, diluent vapor is used as the stripping agent, and the liquid at the bottom of the stripper will be essentially free of $C_4$'s. Since the temperature throughout the tower has to be maintained below 100° F., preferably below 70° F., in order to suppress decomplexing, the pressure in the tower must be low enough to enable the $C_5$-diluent to exist as vapor at this maximum temperature. This limits tower operating pressure to below 20 p.s.i.a., or a broad range of 1–20 p.s.i.a., and preferably 2–10 p.s.i.a. The tower top temperature can be appreciably lower than the bottoms temperature, since sufficient butenes are present in the vapors and liquids of the top trays to lower the dew point of the hydrocarbon mixture below that of the pure diluent vapor at the bottom of the tower. Broad, preferred and specific tower top and bottom conditions are listed in Table A below.

On the other hand, in the processing scheme illustrated in FIG. 2, butadiene-containing vapor is used as the stripping agent, and the liquid at the bottom of the tower will contain an appreciable quantity of butadiene. Actually, the liquid on all plates of the tower will contain appreciable quantities of $C_4$'s. This allows operation of the tower above atmospheric pressure. In addition, since butadiene is present on all plates of the tower, the vapor phase in equilibrium with these liquids will contain a high enough partial pressure of butadiene so that no decomplexing will take place at quite elevated temperatures. Thus, at tower pressures in the range of 15–75 p.s.i.a. (top), top plate temperatures, of the order of 60–130° F. are possible without decomplexing. Tower bottoms temperatures may be higher, since the partial pressure of butadiene increases as butenes are replaced by butadiene. The bottoms temperature may range (for the above pressure range) from 100–180° F. Tower conditions for this case are again listed in Table A below.

TABLE A.—STRIPPER TOWER OPERATING CONDITIONS

| Flow Scheme (Stripping Vapor) Diluent (Specific) | Figure 1 Diluent in $C^5$ | | | Figure 2 Butadiene+Diluent in $C^7$ | | |
| --- | --- | --- | --- | --- | --- | --- |
| | Broad | Preferred | Specific | Broad | Preferred | Specific |
| Tower Top: | | | | | | |
| Temperature, °F | −20–50 | −20–30 | 20 | 50–130 | 70–120 | 100 |
| Pressure, p.s.i.a. | 1–20 | 2–10 | 8 | 15–80 | 15–70 | 17 |
| Tower Bottom: | | | | | | |
| Temperature, °F | 10–80 | 20–70 | 60 | 80–180 | 120–160 | 130 |
| Pressure, p.s.i.a. | 4–30 | 4–20 | 12 | 17–85 | 17–75 | 25 |
| Stripped Slurry: | | | | | | |
| Butenes, mol. percent on liq | 0–5 | 0–1 | 0.05 | 0–5 | 0–1 | 0.05 |
| Butadiene, mol. percent on liq | 0–5 | 0–1 | 0.5 | 10–50 | 15–40 | 25 |

The stripped, complexed cuprous halide sorbent particles are then transported in liquid slurry form to decomplexer 23 and decomplexer-stripper 34, where they are subjected to conditions of temperature and pressure sufficient to desorb (decomplex) the previously sorbed 1,3-butadiene therefrom. This decomplexing and desorption can be accomplished at temperatures of about 120 to about 240° F. and pressures ranging from about 10 to about 150 p.s.i.a. Usually, the decomplexing is conducted at temperatures ranging from about 150 to about 230° F. and pressures of about 15 to about 110 p.s.ia. Preferably the decomplexing is conducted at temperatures of about 170 to about 210° F. and pressures of about 15 to about 90 p.s.i.a. As noted hereinabove, the complexing, stripping, and decomplexing operations are each conducted with the solid particles slurried in the liquid phase. The stripped slurry bottoms from tower 34 are recycled to complexing stages 2, 3 and 4 as described previously.

As will be noted in examples below, it is desired to remove the 1,3-butadiene from the liquid rapidly as it is released during decomplexing to minimize the residence time of the solids in the decomplexer at high temperatures due to the fact that the presence of extraneous 1,3-butadiene reduces decomplexing rates. Laboratory studies have shown that long holding (residence) times at high temperatures tend to deactivate the sorption-active sorbent. Thus, high 1,3-butadiene concentrations in the decomplexer retard decomplexation rate, reduce sorbent activity and necessitate larger decomplexer vessels when longer residence times are used. The 1,3-butadiene stripping is conducted at temperatures of about 120 to about 260° F. and at pressures of about 1 to about 160 p.s.i.a. Usually, the 1,3-butadiene stripping is performed at temperatures of about 140 to about 240° F. and at pressures of about 15 to about 120 p.s.i.a. Preferably the 1,3-butadiene stripper is operated at temperature and pressure conditions within those specified above and for a sufficient time such that the 1,3-butadiene concentration in the recycle slurry stream (solids plus liquid) existing at line 46 is less than 5 wt. percent and more preferably ranges between 0 and 2 wt. percent. Therefore, the temperatures preferably employed are no higher than those required to vaporize sufficient quantities of inert liquid diluent to strip sufficient 1,3-butadiene from the slurry (solids plus liquids) so that the existing slurry stream 46 contains less than about 5 wt. percent, 1,3-butadiene and more preferably between about 2 and 0 wt. percent, 1,3-butadiene. The additional amounts of 1,3-butadiene removed from the initially decomplexed sorbent particles in 1,3-butadiene stripper 34 are passed along with the initially decomplexed 1,3-butadiene to the 1,3-butadiene diluent splitter to remove the diluent components therefrom.

A preferred embodiment of this invention employs a combination decomplexer-1,3-butadiene stripper tower where the decomplexed 1,3-butadiene is rapidly removed as it is released by stripping with hot inert diluent vapor butadiene-1,3-vapor.

The desorbed 1,3-butadiene can then be passed to the 1,3-butadiene-pentane splitter 30, to separate the 1,3-butadiene from the pentane liquid diluent component, although this can be accomplished as an integral portion of the decomplexer.

These diluent fractions are removed by splitter 30 which is operated at conditions sufficient to control the diluent, e.g., pentane, concentration of the product 1,3-butadiene stream 38 at from 0.5 to 0.0 wt. percent. Usually this 1,3-butadiene diluent splitting will be conducted at temperatures of 20 to 260° F. and accompanying pressures of 15 to 140 p.s.i.a. Preferably, however, this splitting (fractionation) is conducted so as to limit the inert diluent concentration in the exiting 1,3-butadiene product stream 38 to from 0.2 to 0.0 wt. percent $C_5^+$ components, and preferably this operation is conducted at temperatures of 25 to 250° F. with pressures of 15 to 75 p.s.i.a.

While the composition of the 1,3-butadiene-containing feed stream can vary widely, this feed will always contain 1,3-butadiene and butenes and should be completely free of bulk water. The presence of bulk water causes the formation of degradation products in the cuprous halide sorbent solids, which in turn promote low butadiene product purity. Furthermore, the presence of bulk water exerts a corrosive influence on the apparatus employed in separating and recovering 1,3-butadiene. Prior to conducting the process of this invention, it is necessary to insure that the liquid slurry medium contains an inert liquid paraffin diluent having the properties (a), (b) and (c) mentioned hereinabove. If the 1,3-butadiene containing feed stream, itself, does not contain such a diluent (and usually it does not), this diluent must be added to the system prior to subjecting the feed stream to the process of this invention. As noted above, the inert liquid organic diluent can be placed in the complexing vessels along with the sorption-active cuprous halide sorbent prior to feeding the 1,3-butadiene-butene containing feed stream thereto. Alternatively said diluent can be mixed with the 1,3-butadiene-containing feed stream prior to passing into the first complexing stage. In any event, the liquid portion of the liquid-solids slurry must contain said diluent in accordance with the process of this invention. The said diluent concentration (expressed as a wt. percent based on the total cuprous halide sorbent solids in the liquid-solids slurry) in all the complexing vessels can range from 40 to 900 wt. percent, usually ranges from about 60 to about 250 wt. percent, and more preferably ranges from about 65 to about 120 wt. percent. Moreover, as noted above, the liquid portion of the slurry medium must be essentially anhydrous and preferably contains less than 300 parts per million (p.p.m.) water (based on total liquid content of slurry).

Once the startup has been accomplished, the recycle slurry stream 46 usually provides sufficient paraffin diluent for lined out operation in a continuous process. Consequently, usually no additional diluent need to be added except for makeup amounts to replenish diluent lost in normal operations and via purges to maintain diluent purity.

It should be noted that the cuprous halide sorbent particles should be kept wet with the paraffin diluent liquid slurry medium throughout the entire process and especially during the steps of liquid phase slurry complexing, butene stripping, and decomplexing. This is especially important when the cuprous halide sorbent solids are employed in a continuous 1,3-butadiene separation and recovery process where they are recycled for further use in sorbing and hence separating 1,3-butadiene from 1,3-butadiene-containing streams. Drying of the cuprous halide sorbent particles before recycling decreases the activity thereof. Results from experimental data indicate that cuprous chloride sorption-active sorbent solids possess a higher sorptive capacity when kept wet through repeated complexing, butene stripping, and decomplexing stages than the same cuprous chloride sorbent subjected to the same stages only dried between recycling runs.

While the concentration of sorption-active cuprous halide solids present in the liquids-solids slurry can vary considerably during the complexing, butene stripping and decomplexing operations the concentration of the cuprous halide sorbent particles (solids) in each of these stages is kept within the below tabulated ranges, expressed hereinbelow in terms of "can use," "usually use" and "preferably use."

CONCENTRATION OF CUPROUS HALIDE SOLIDS IN SLURRY MEDIUM DURING INDICATED STEPS
[Wt. Percent on Total and Liquids in Slurry]

| Step | Can Use | Usually Use | Preferably Use |
| --- | --- | --- | --- |
| Liquid Phase Slurry Complexing | 5 to 65 | 25 to 60 | 35 to 60 |
| Slurry Butene Stripping | 15 to 70 | 35 to 65 | 45 to 60 |
| Slurry Decomplexing | 10 to 65 | 30 to 60 | 40 to 60 |

INERT ORGANIC LIQUID DILUENT

Any organic liquid diluent can be used in the essentially anhydrous all slurry 1,3-butadiene separation and recovery process of this invention which (a) is essentially inert to reaction with said cuprous halide sorbent particles (b) has a boiling point higher than 1,3-butadiene, butenes and butanes and either (1) has a boiling point lower than the sorbent deactivation temperature or (2) if per se higher is used in the presence of an inert boiling point depressant which lowers the boiling point below said sorbent deactivation temperature. Of course, it is usually preferable to use (1) an inert liquid diluent which has a boiling point below the sorbent deactivation temperature because when a (2) type liquid diluent is employed it may become necessary to separate said boiling point depressant from the (2) inert liquid diluent (subsequent to the 1,3-butadiene stripping operation, e.g. as conducted in stripper 34), recover it and recycle it for further use. This can increase the equipment requirement and raise the cost of conducting the 1,3-butadiene separation and recovery.

Usually the inert liquid diluent, whether within category (1) or (2), boils above 80° F.; melts below −20° F.; has a low viscosity at operating temperatures; dissolves less than 1% of either said suitable cuprous halide sorbents, salts or the 1,3-butadiene complexes thereof; and can be separated readily from the product 1,3-butadiene, raffinate butenes and butanes (preferably by simple distillation or flashing), and any 1,3-butadiene dimers or other polymers of butadiene, and/or $C_3$ and $C_4$ acetylenes. Also as noted in (a) above, the inert liquid organic diluent should neither complex with the cuprous halide sorbent nor have reactions catalyzed by said cuprous halides.

Preferred inert liquid diluents coming within category (1) are $C_5$ to $C_7$ paraffins, including mixtures thereof, such as pentanes, hexanes, and heptanes, esp., n-pentane, isopentane, n-hexane, iso-hexane, n-heptane, iso-heptane (and isomers or mixtures containing any two or more $C_5$ to $C_7$ alkanes). Some highly branched octanes, e.g., 2,2,4-trimethyl pentane, and paraffin mixtures (including $C_8$ and lower isomer mixtures) containing it can also be employed without boiling point depressants since the boiling point of 2,2,4-trimethyl pentane (~210° F.) is below that temperature at which significant sorbent deactivation takes place, viz, below about 212° F. $C_5$ to $C_7$ alkanes are preferred as inert liquid organic diluents because stripping of butenes and butanes can be conducted at low temperatures without causing excessive decomplexing of the already formed complex. Furthermore $C_5$ to $C_7$ alkanes permit dissociation of the said cuprous halide-1,3-butadiene complex with essentially no loss of cuprous halide porosity and even enhanced sorptive capacity and activity of the sorbent particles permitting startup and makeup using raw (commercial) cuprous halide salts. Furthermore, these $C_5$ to $C_7$ alkanes permit the attainment of very high purity product 1,3-butadiene, e.g. 99.5+, and are believed to enhance overall process rejection of acetylenes, esp. the difficult to remove vinyl acetylenes.

Heavier hydrocarbons, however, e.g. $C_8$ to $C_{12}$ alkanes coming within category (2) do have a salient advantage due to their easier separation from the product 1,3-butadiene; and due to their higher molecular weight, they result in less of a diluting effect during the complexing step(s). Moreover, these $C_8$ to $C_{12}$ alkane diluents lessen recycle buildup in the stripping and complexing operations. Suitable $C_8$ to $C_{12}$ alkanes which can be used (with inert boiling point depressants where applicable) include, e.g. n-octane, n-nonane, n-decane, n-undecane, n-dodecane, isomers, and mixtures containing two or more $C_8$ to $C_{12}$ alkanes.

In addition to the above paraffins, other materials can be present in the essentially anhydrous, inert liquid organic diluent, e.g., $C_5$ to $C_7$ monoolefins with the corresponding $C_5$ to $C_7$ alkanes; $C_8$ to $C_{12}$ monoolefins with the corresponding $C_8$ to $C_{12}$ alkanes, etc. Likewise, inert aromatics (or aromatics less preferentially sorbed by the said cuprous halide sorbents than 1,3-butadiene) can be employed provided that said aromatic(s) are liquids at the processing conditions of temperature and pressure at which the complexing, stripping, decomplexing, and other processing operations take place. Usually said aromatics will be aromatic hydrocarbons, including alkylated monocyclic aromatic hydrocarbons, containing from six to twelve carbon atoms, e.g., benzene, toluene, ortho and meta-xylenes, cumene, cymene, etc. Usually the inert liquid organic diluent should contain about 50+ wt. percent of said abovementioned paraffins with permissive inclusion of corresponding monoolefins, inert aromatics, etc., making up as much as the remaining balance of the liquid diluent.

SOLID CUPROUS HALIDE SORBENT PARTICLES

According to the present invention, a portion, e.g., usually at least 25 wt. percent of the total amount of cuprous halide solid sorbent particles are sorption-active particles (except, of course at startup, when all or almost all the cuprous halide can be commercial cuprous halide salt). The term "sorption-active" as employed herein is employed to denote cuprous halide sorbent particles which have a porosity of about about 10% (of the total volume of a particle) 550 to 10,000 A. pores, as determined by mercury porosimeter measurements. Preferably at any given stage in the above indicated 1,3-butadiene separation and recovery process, the concentration of sorption active cuprous halide particles (at lined out conditions) ranges from about 75 to about 100% by weight based on the total amount of solid particles in the slurry (total amount of cuprous halide solids present in the slurry). The sorptive capacity of these sorption-active sorbent particles usually ranges from about 35 to 99+% and more preferably from 50 to 99+% based on the theoretical capacity for sorption of 1,3-butadiene (stoichiometric ratio: 1 mole of 1,3-butadiene complexes with 2 moles of said cuprous halide). The overall sorptive capacity of the total amount of sorbent particles present in the slurry can range from 20 to 95%, which is an average figure giving the overall or average sorptive capacity of the total amount of cuprous halide sorbent present in the slurry including material which is of high sorptive capacity and material having either very low sorptive capacity or that material which is raw (comparatively nonporous and inactive) cuprous halide salt.

As noted hereinabove, it is a highly beneficial aspect of the present invention that material having low sorptive capacity for sorbing 1,3-butadiene can be employed at startup, or to constitute makeup cuprous halide sorbent, or even to constitute a predominant or substantial portion of the sorbent employed according to this invention. This is possible due to the surprising increase in sorptive activity level of the cuprous halide sorbent particles demonstrated by higher lined out sorptive capacity as succeeding complexation, stripping, and decomplexation cycles are put on the sorbent particles during continual or continuous operation of the process of this invention. Thus, it is possible to add makeup sorbent as the raw (nonporous and nonsorptive-active) salt which is then activated during the repeated sorption-stripping, and desorption cycles put on the sorbent during repeated operations in any given 1,3-butadiene separation and recovery campaign. Furthermore, the entire or at least a substantial portion of the sorbent can be raw cuprous halide salt which is activated by repeated cycling in the manner mentioned hereinabove. However, even the raw (commercial grade) cuprous halide salt should be 95+% pure material being substantially anhydrous (<1.0 wt. percent water). Preferably, however, at the outset of the process and throughout its extent 25 to 100 wt. percent of the total cuprous halide sorbent is sorption-active material as defined hereinabove.

The sorption-active cuprous halide sorbent particles can be prepared from fairly high purity, viz 95+% pure, commercial cuprous chloride, cuprous bromide, and cuprous iodide salts with less than 1 wt. percent moisture content. The preferred cuprous halide sorbents are cuprous chloride sorbents prepared from 99+% pure CuCl salt which is substantially moisture-free, viz contains less than 0.5 wt. percent moisture (based on dry CuCl). As noted above, the sorption-active porous sorbent particles can be prepared from the raw cuprous halide salts in situ by cycling through the sorption (complexing), stripping, and desorption (decomplexing) operations outlined hereinabove. However, the sorption-active cuprous halide sorbent particles need not be prepared in this manner. They can be prepared in accordance with a wide variety of sorption-active sorbent preparation procedures, e.g., as set forth in U.S. Ser. Nos. 333,925 and 333,926 filed on or about Dec. 27, 1963. The disclosure of these cuprous halide sorbent preparation procedures is incorporated herein by reference.

Basically, the procedures of Ser. Nos. 333,925 and 333,926 involve either dissolving the cuprous halide salt in a suitable solvent or forming an aqueous or other slurry thereof followed by complexing the dissolved or slurried particles with a conditioning (complexing) ligand capable of forming a stable copper-ligand complex having a mole ratio of copper to complexing ligand of greater than 1:1.

If the copper-ligand complex is formed from a solution of the cuprous halide salt, the cuprous halide solution is usually prepared by dissolving the raw cuprous halide salt at temperatures ranging from about −40° F. to about 140° F. usually accompanied by stirring or other agitation to insure adequate dissolving of the salt in the solvent. While a wide variety of solvents can be used, usually a $C_4$ to $C_{12}$ monoolefinic solvent or mixtures thereof is employed. The thus formed solutions are then filtered to remove insolubles prior to complexing and decomplexing. The complexation-decomplexation cycle imports the desired porosity to the cuprous halide salt and in effect converts it from a sorption-inactive raw cuprous halide salt to a sorption-active cuprous halide sorbent capable of preferentially sorbing 1,3-butadiene from gaseous and liquid mixtures containing it. Essentially the same procedure is employed in preparation sorption-active cuprous halide particles by use of aqueous and organic slurry media.

When the sorption-active cuprous halide sorbent is prepared by the solution or slurry procedures of S. N. 333,925 or 333,926, it is preferable to employ complexing agents (conditioning ligand) which form a stable complex having a mole ratio of copper to complexing moiety of 2:1 and higher. Such compounds include both materials which form only complexes having said ratios of copper to complexing compounds greater than 1:1 and also compounds which form complexes having a ratio of 1:1 or less which upon decomplexing pass through a stable complex having a ratio of copper to complexing compound greater than 1:1, and preferably of 2:1 and even higher as indicated above. Thus, certain materials, e.g., nitriles, diolefins, acetylenes, carbon monoxide, etc., under ordinary conditions forming a 2:1 complex can be made to complex in ratios of copper to complexing compound of 1:1 or less. However, upon dissociation, complexing material is released selectively from a bed of cuprous halide until the stable complex, viz., the complex having a copper to complexing moiety mole ratio above 1:1, e.g., 2:1 stoichiometric complex is completely formed before further decomplexing to the uncomplexed (sorption-active) cuprous sorbent particles occurs. In this specification by "stable complex" is meant a stoichiometric complex stable upon dissociation as described in the preceding sentence. Such "conditioning" complexing agents which can be employed in accord, but are not limited to, the following: $C_3$ to $C_{10}$ conjugated or non-conjugated aliphatic, cyclic, or alicyclic polyolefins, e.g., butadiene-1,3, isoprene, piperylene, allene, octadienes, cyclohexadienes, cyclooctadienes, divinylbenzene, cyclododecatriene, cyclooctatetraenes, $C_2$ to $C_{10}$ aliphatic or alicyclic acetylenes or acetylenes containing additional unsaturation, e.g., acetylene, methyl acetylene, propyl acetylenes, phenyl acetylene, vinyl acetylene, etc.; $C_2$ to $C_{10}$ or higher unsaturated or saturated aliphatic or alicyclic nitriles, e.g., acetonitrile, acrylonitrile, propiononitrile, phenylnitrile, methacrylonitrile, ethacrylonitrile, etc. carbon monoxide, HCN; etc. Of course, more than one of these functional groups can be present in a single molecule of the "conditioning" ligand.

According to the present invention, the particle size of the sorption-active cuprous halide sorbent particles can be widely varied as long as the average particle size is $<400\mu$, and usually a wide variety of particle sizes will be found in the slurry. Usually, however, the slurry particles will have average particle sizes of less than $200\mu$ and with characteristically individual particles ranging in size from about 0.1 to about 400 microns. Preferably the average particle size of the sorbent is less than about $100\mu$.

The present invention will be illustrated in further detail in the following examples, which are to be considered as illustrative of the present invention and not limiting thereon.

Example 1

A $C_4$ hydrocarbon stream, containing about 35% by weight 1,3-butadiene was collected in a cylinder as a liquid and the bulk water removed by decanting. The water of saturation was removed by passing the hydrocarbon stream liquid phase through a bed of activated alumina pellets. This dry $C_4$ hydrocarbon material was used in evaluating the capacity of the adsorbent, and therefore the recovery of 1,3-butadiene with the cuprous halide adsorbent. A typical feed stream analysis (free of bulk water and water of saturation) is shown in Table I.

TABLE I

| Compound: | Wt. percent |
|---|---|
| Isobutane and propylene | 0.51 |
| n-Butane | 1.37 |
| Butene-1 and isobutylene | 43.44 |
| t-Butene-2 | 11.03 |
| c-Butene-2 | 8.09 |
| 1,3-butadiene | 35.13 |
| Methylacetylene | 0.03 |
| 1,2-butadiene | 0.17 |
| 1,4-pentadiene | 0.02 |
| Ethylacetylene | 0.08 |
| Isoprene | 0.01 |
| Vinylacetylene | 0.12 |

The reaction vessel, a one-liter jacketed glass autoclave, was cooled to 60° F. by circulating a coolant through the jacket and 300 grams of research grade normal pentane added to the vessel. To this pentane, 150 grams of the active cuprous halide (CuCl) was added and agitation of the slurry established using a stirrer speed of 1200 r.p.m. with a 3-inch diameter marine propeller. With the slurry at 60° F., 100 grams of the above feed was added and liquid phase slurry complexation of the solid allowed to take place (1 to 10 minutes). The color of the slurry changed from gray to yellowish and the temperature therof rose 10 to 15° F. during complexing (heat release of approximately 6 kilocalories per gram mole of cuprous chloride complexed). The slurry vessel was then removed from the agitator and all liquid filtered from the solids on a vacuum filter. The essentially dry solids were then placed in a vertical 1″ x 24″ jacketed glass column with a fritted glass bottom and heat applied by means of the jacket at 130° F. for 1 hour while blowing the solids with a vapor of research grade 1,3-butadiene. The purpose of this step is to remove the free butene and pentane adhering to the solids. The stripping gas was then changed to nitrogen and a small volume of fresh gas passed over the solid to remove the existing 1,3-butadiene vapor from the previous operation. To the top of the column was then affixed a double condenser and collection system in which the 1,3-butadiene and other vapors would be condensed and collected. The temperature of the jacket around the complexed solid was then increased to approximately 180° F. and the solid decomplexed in the stream of nitrogen. The exit gas stream containing 1,3-butadiene was passed through the —70° F. condensers mentioned above and the 1,3-butadiene condensed.

The product collected in the condenser receiver was then removed and analyzed by sensitive gas chromatographic equipment. A typical analysis of the product from the 60° F. complexation is shown in Table II.

TABLE II

| Compound: | Wt. percent |
|---|---|
| Isobutylene and propylene | 0.0005 |
| n-Butane | 0.0013 |
| Butene-1 and isobutylene | 0.0479 |
| t-Butene-2 | 0.0059 |
| c-Butene-2 | 0.0091 |
| 1,3-butadiene | 99.8633 |
| Methyl acetylene | 0.0 |
| 1,2-butadiene | 0.0 |
| 1,4-pentadiene | 0.0409 |
| Ethyl acetylene | 0.0019 |
| Isoprene | 0.0140 |
| Vinyl acetylene | 0.0128 |

Furthermore complexation tests conducted as indicated above, except at other reactor temperatures, gave decreased amounts of vinyl acetylene in the 1,3-butadiene product with increasing complexation temperature and an overall increase in 1,3-butadiene concentrates. A substantial gain in product purity is thereby obtained by slurry complexing in the liquid phase but at higher temperatures and this advantage is shown in Table III.

TABLE III

| Temperature of Complexing, °F | 0 | 40 | 60 | 77 | 90 | 120 |
|---|---|---|---|---|---|---|
| Total 1,3-butadiene, Wt. Percent | 96.27 | 99.66 | 99.86 | 99.94 | 99.95 | 99.95 |
| Vinyl acetylene, p.p.m. | 1,390 | 355 | 128 | 47 | 22 | 20 |

The 1,3-butadiene product produced during complexing in the presence of pentane is superior to the purity of the material produced by other methods of complexation. A comparison of products collected by the above method of stripping and decomplexing, but produced by vapor phase fluid bed complexation and by transfer line complexation using liquid 1,3-butadiene-containing feed injection (liquid phase complexing) but vapor phase stripping and decomplexing with product produced by complexing in the presence of pentane as discussed above is shown in Table IV.

TABLE IV

| Method of Complexation | Fluid Bed | Transfer Line | Pentane Slurry |
|---|---|---|---|
| Product: | | | |
| 1,3-butadiene, Wt. Percent | 99.76 | 99.13 | 99.95 |
| Ethyl acetylene, p.p.m. | 3 | 21 | 4 |
| Vinyl acetylene, p.p.m. | 93 | 67 | 22 |

Example 2

In the reactor system described in Example 1, the 150 grams of cuprous halide adsorbent can theoretically recover 40.8 grams of 1,3-butadiene, where the reaction is $$2CuCl + C_4 \rightleftharpoons (CuCl)_2C_4$$

and excess 1,3-butadiene above the equilibrium value is available. This condition is referred to as 100 percent complexed where all available cuprous halide is reacted with 1,3-butadiene. Equilibrium 1,3-butadiene values were determined in the experimental system described in Example 1 at various temperatures by adding excess adsorbent, i.e. 300 grams of the active solid adsorbent, and by sampling both the liquid and vapor from the system. These liquid and vapor samples were analyzed by gas chromatograph and using the vapor pressure of pure 1,3-butadiene liquid results were converted to dissociation pressure of the complexed adsorbent. Total reactor pressure and mole fraction 1,3-butadiene in the vapor were used to determine dissociation pressure of the complexed adsorbent from vapor phase samples.

Results from these tests indicate that in the above-described system about 99% recovery of the 1,3-butadiene can be obtained in a reactor operating at 20° F. in holding times of greater than 10 minutes. Results from dissociation pressure measurements are shown below in Table 2–I.

TABLE 2–I

| Temperature, °F.: | Dissociation press, p.s.i.a. |
|---|---|
| 0 | 0.010 |
| 20 | 0.038 |
| 40 | 0.120 |
| 60 | 0.340 |
| 80 | 0.960 |
| 100 | 2.50 |

In both the vapor phase fluid bed complexation and complexation by use of a transfer line with 1,3-butadiene containing feed liquid injection temperatures of about 20 to 40° F. are required to obtain 99 percent recovery of the butadiene. To obtain these low temperatures, low pressures in the order of 5 to 15 p.s.i.a. are required for vapor-solid fluid bed operations. However, in using an inert diluent to carry the adsorbent (sorbent) as a slurry, low pressures are not required to obtain the desired recovery of 99 percent in the complexing reactor.

Example 3

As indicated in Example 1, the temperature of complexation affects the purity of the complexed 1,3-butadiene. This effect is not substantially reversible in that solids complexed to a given level do not give off preferentially the impurities first. This decomplexing was accomplished by the method described in Example 1 and the results are shown in Table 3–I following. These solids were complexed to provide 1,3-butadiene of comparatively lower purity (99.23%) than normally attainable by the instant process in order to study the effect of decomplexing on product purity.

TABLE 3–I

| Percent decomplexation: | 1,3-butadiene in product, wt. percent |
|---|---|
| 0 | 99.23 |
| 3 | 99.26 |
| 8 | 99.28 |
| 15 | 99.33 |
| 42 | 99.39 |
| 69 | 99.43 |

Further the purity of the complexed 1,3-butadiene for a 99% recovery can be controlled to some extent by complexing a large portion of the 1,3-butadiene at high temperatures and then in order to obtain the recovery desired, cooling the slurry liquid to a lower temperature. The results from operating in such a manner are shown in Table 3–II.

TABLE 3–II

| Initial Percent Complex | 0 | 0 | 0 |
|---|---|---|---|
| Final Percent Complex | 60 | 65 | 60 |
| Complexation Temp., °F | 90 | 90–35 | 35 |
| 1,3-butadiene, Wt. Percent | 99.95 | 99.86 | 99.66 |
| Vinyl acetylene, p.p.m. | 22 | 68 | 355 |

For comparison, the results of fully complexing the solid at 35° F. are shown in the last column of Table 3–II. It can be seen that partially complexing at high temperatures of 90 to 120° F. followed by fully complexing at lower temperature to obtain the desired recovery, results in a purer 1,3-butadiene product than obtained by complexing the solid fully at the lower temperature to obtain the desired recovery.

Example 4

In the reactor system described in the foregoing examples, it is clear that recovery of 1,3-butadiene from a given feedstock under liquid phase conditions is determined primarily by the extent of feedstock dilution with extraneous inert, liquid slurry medium, i.e. pentane, or heptane, the temperature of operation (which determines the dissociation pressure of the complexed 1,3-butadiene), and the extent to which the system is allowed to come to equilibrium (or more directly, the holding time of the reactants and the rate at which the reactants approach equilibrium). The rate of approach to equilibrium, viz., the reaction rates of the components, was determined in a reactor similar to that described in Example 1, but into which was attached a chamber for releasing a given quantity of activated cuprous chloride sorbent in the decomplexed form under the reaction liquid, Also inserted into the reaction liquid was a high response thermocouple (for measuring temperature rise in the reactor contents) and affixed to the vapor space was a rapid response pressure measuring device. The output of both the thermocouple and pressure sensing device were recorded on a very sensitive high speed recorder. By releasing a given quantity of sorbent solid into a known liquid mixture high in 1,3-butadiene concentration and knowing the heat of reaction of 1,3-butadiene with cuprous halide, the extent and rate of reaction were determined. For example, using a charge of 300 grams of liquid pentane diluent and 300 grams of typical raw C$_4$ feed containing approximately 33 wt. percent 1,3-butadiene, approximately 20 grams of decomplexed activated cuprous halide adsorbent was placed in the submerged chamber and the system allowed to come to an equilibrium temperature. The sorbent solids were then released, allowed to react, and the temperature and pressure rise recorded. During the complexing only approximately 4 to 5 grams of the total (approximately 100 grams) of 1,3-butadiene are removed from the liquid, and therefore the system is considered to be equivalent to a differential reactor with a very small change in 1,3-butadiene concentration. Using a first order reaction model the psuedo first order rate constant was determined at various average temperatures of the reactant mixture and the results are shown in Table 4–I below.

TABLE 4–I

| Temperature, ° F.: | Pseudo first order rate consant |
|---|---|
| 4 | 1.6 |
| 20 | 2.6 |
| 42 | 4.2 |
| 60 | 2.2 |
| 82 | 0.85 |
| 105 | 0.27 |

\# Moles 1,3-butadiene hr., \# Adsorbent, Δ mol fraction C$_4$== driving force *

*Δ Concentration C$_4$== (butadiene) driving force is equal to actual C$_4$== concentration in the system minus the equilibrium C$_4$== concentration at that temperature in the presence of active uncomplexed complexing agent.

These data indicate that the fastest approach to equilibrium is obtained at temperatures in the range of 20 to 60° F. for high 1,3-butadiene concentrations, i.e. about 15–20% in slurry liquid, and more preferably in the order 40 to 50° F. At lower 1,3-butadiene concentrations, i.e. 1–5%, higher rate constants are obtained at even lower temperatures.

Example 5

In the reactor system described in the foregoing examples, the extent of 1,3-butadiene recovery from a typical raw feed containing 1,3-butadiene was determined. Multiple stages were utilized to reduce impurities, cost of operation and to improve recovery. A first-stage recovery of a typical two-stage system was demonstrated by adding to a 50 wt. percent slurry of pentane and cuprous halide containing 300 grams of pentane and 300 grams of cuprous chloride, 137 grams of raw C$_4$ feed containing 33 wt. percent 1,3-butadiene at a reactor temperature of 105° F. After one hour the solids were removed from the liquid by filtering, as described above, and the amount of 1,3-butadiene complexed was determined to be 40.2 grams. With only 45.2 grams of 1,3-butadiene fed this is equal to 88.9% recovery, but based on dissociation pressure at 105° F., the expected recovery is 90.5% if the system had gone to equilibration. The solids were complexed to a level of 49.2% as determined by the method in Example 3.

A portion of the remaining 1,3-butadiene in the liquid can be recovered by cooling the reactants and slurry to lower temperatures. For example in a reactor at 60° F. a slurry of 303.7 grams of adsorbent that was 50 percent complexed (equal to 264 grams of decomplexed solid) was added to 300 grams of pentane. To the reactor was added 125 grams of raw feed diluted with essentially 1,3-butadiene-free butenes to give a feed containing 12.9 grams of 1,3-butadiene. The percent complex of the solid increased from 50 percent to 67.9 percent in ten minutes resulting in an increase in 1,3-butadiene complexed of 9.2 grams. The recovery in the second stage reactor was equal to 71.3 percent of the 1,3-butadiene fed and the combined recovery of both stages is equivalent to approximately 92 percent of the feed 1,3-butadiene fed to the first stage. The total recovery can be increased significantly by further reduction in temperature to approximately 10 to 20° F. so that 98 to 99 percent of the total 1,3-butadiene fed is recovered.

Example 6

Multiple stage or one stage recovery of 1,3-butadiene was demonstrated in a continuous flow stirred tank reactor rather than a batch laboratory reactor. This reactor consisted of a continuous screw feeder for dry complexed or partially complexed cuprous halide, an appropriate liquid feed and diluent blending tank with flow controls, a stirred tank reactor of 1000 cc. volume into which each of the feeds, solid and liquid, connected, and a slurry receiver vessel. The stirred tank reactor was equipped with cooling and an overflow for slurry to the slurry receiver, and the slurry receiver was provided with a filter medium to remove the solids from the liquid. The stirred tank reactor also had thermocouple connectors to allow temperature measurement and a liquid sample point to sample the slurry liquid connected to a very sensitive continuous automatic sample gas chromatograph. Pressurized operation was either obtained by a superficial nitrogen overpressure or by allowing the feed C$_4$ stream to partially vaporize.

To the liquid feed tank pentane and the raw 1,3-butadiene containing feed were added and blended by a pump-around system to give a feed of the desired composition. The stirred reactor was then filled to the overflow point with this material with the agitator in operation at 900 to 1200 r.p.m. using a 3-inch marine propeller. The dry solids feed was then started at the desired rate and reactor slurry temperature adjusted by use of coolant on the reactor walls. The weight ratio of solids to pentane in the slurry vessel was varied over a considerable range; however, normal operation was from 0.5:1 to 2:1; more preferably 1:1. The weight percent 1,3-butadiene in pentane was normally 3% to 17% depending on the stage of recovery being simulated. The solids recovered in the slurry receiver were either dried and decomplexed for further studies or recycled to the system via the solids feeder for simulation of the staged recovery system. A typical three stage operation consists of recycling the solids to the reactor twice, and the results are shown in the following table.

|  | 1st Stage | 2nd Stage | 3rd Stage |
|---|---|---|---|
| Temperature, °F | 105 | 55 | 10 |
| Holding Time, Min | 20 | 10 | 10 |
| Feed Composition, percent $C_4^=$ | 15.2 | 6.6 | 0.96 |
| Percent 1,3-butadiene Recovery, Overall | 60.3 | 93.0 | 99.0 |
| Slurry Solids, Wt. Percent on $C_5$ Diluent plus solids | 52 | 49 | 54 |

Example 7

Although recovery or complexion of the 1,3-butadiene is affected by the methods shown in Examples 1 through 6, actual recovery of 1,3-butadiene for end use has only been shown by filtration of the solids from the slurry and decomplexation of the solid material with heat in a column as in Example 1. The remaining undesirable $C_4$ raw feed components in the slurry from the reactors or complexing vessels can however be removed by stripping the slurry at controlled conditions either with a lower boiling component than $C_4$ such as an inert gas, with 1,3-butadiene or with a higher boiling component such as $C_5$. Stripping or removal of the undesirable $C_4$ components from the slurry liquid can be carried in any suitable piece of equipment, either by countercurrent multiple dilution of the slurry with the carrier or by preferential stripping of the undesirable components from the slurry.

Preferential stripping of the undesirable $C_4$ compound was carried out in a 4-inch diameter tower containing 20 slurry contacting plates and using vaporized pentane as the stripping gas. The feed to the top plate of the tower was 122 lb./hr. of pentane, 54.6 lb./hr. of butenes, 0.3 lb./hr. of free 1,3-butadiene and 184 lb./hr. of $C_4^=$ free solid adsorbent with 29.1 lb./hr. $C_4^=$ adsorbed on the solids. This stream entered at 10° F. into the tower operating at 5 p.s.i.a. The stripping gas stream, vaporized pentane, entered below the bottom plate of the tower at approximately 140° F. and a rate of 100 lb./hr. The bottoms from this stripping tower contained essentially no butene or vinyl acetylene and all but 0.25 lb./hr. of the 1,3-butadiene fed to the tower either as free 1,3-butadiene or complexed on the adsorbent.

It is essential and critical to such a stripping operation that the stripping be carried out in such a manner that sufficient holding time and temperature for partial decomplexing of the solids is not provided. For instance, at room temperature of approximately 70° F., three counter-current washes of pentane resulted in a loss of 15 to 18 percent complex in a solid having 63 percent complex entering. This loss results in a recovery loss of approximately 25 percent of the feed 1,3-butadiene. Furthermore, in stripping of the undesirable feed components with pentane it is essential that the holding time be reduced as far as practical to provide the stripping necessary and that the temperatures be controlled such that minimum decomplexing occurs in the stripper. On the other hand when 1,3-butadiene is used as the stripping gas, the partial pressure of butadiene over the slurried complex is sufficient to prevent decomplexing provided that the temperature is maintained below the decomplexing point, which is considerably above the operating temperature in the butene splitter. Therefore, with butadiene-containing stripping gas, residence time on the stripper plates is of no concern. The conditions stated above are an example of such operation. Other methods may be used equally as well to free the slurry liquid of undesirable components before decomplexing the slurried solids.

Example 8

Conducting laboratory tests as described in Example 1 it has been found that a wide variety of particle sizes of the activated adsorbent can be used with excellent results in recovery, activity of the solids, complexing rate, and purity of the recovered 1,3-butadiene is obtained. For example, a sample of activated adsorbent was screened and the portions screened subjected to complexing and purity determinations in a slurry of n-pentane at 90° F. The results shown below indicated no significant difference in the product purity.

TABLE 8–I

| Average Particle Size, $\mu$ | 30 | 50 |
|---|---|---|
| 1,3-butadiene Purity, Wt. Percent | 99.95 | 99.85 |
| Vinyl Acetylene, p.p.m | 22 | 24 |

Further screened solids were subjected to reaction rate tests as described in Example 4 and no appreciable difference in reaction rate was obtained for activated solids of the below noted different particle sizes. The results of these studies are shown below in Table 8–II, for tests conducted at 60° F.

TABLE 8–II

| Particle size, $\mu$ | Complexation time, seconds |
|---|---|
| 150–420 | 137 |
| 0–44 | 131 |

Example 9

Laboratory tests were primarily conducted in the presence of a research grade pentane or other inert liquid paraffin slurry media of research grade. However, data on commercial (less pure) slurry media indicate that the slurry media is not critical to either the dissociation pressure of the complex or the product purity of the complexed 1,3-butadiene. In tests conducted using the procedure of Example 1, the following comparison of product purity was obtained.

TABLE 9–I

| Slurry Media | Research Grade | | | Commercial Pentane | (95+Wt. percent Pentanes) Hydrofined Refinery $C^5$ Paraffin Stream |
|---|---|---|---|---|---|
| | Heptane | Pentane | Isopentane | | |
| Complexing Temperature °F | 90 | 90 | 90 | 90 | 90 |
| 1,3-butadiene purity, Wt. percent | 99.91 | 99.95 | 99.90 | 99.86 | 99.98 |
| P.p.m., Vinyl acetylene | 20 | 22 | 24 | 22 | 26 |

To determine the effect of other slurry media on the theoretical recovery of 1,3-butadiene, it is necessary to evaluate the dissociation pressure of the 1,3-butadiene-cuprous halide complex. As in Example 2, various slurry media were evaluated and no differences were found in the dissociation pressure of the cuprous halide-butadiene complex. The data resulting from these tests are shown in Table 9–II.

TABLE 9–II

| Temperature, °F | 0 | 20 | 40 | 60 | 80 | 100 |
|---|---|---|---|---|---|---|
| Dissociation Pressure, P.s.i.a., Slurry Media: | | | | | | |
| Pentane | 0.010 | 0.038 | 0.120 | 0.340 | 0.960 | 2.50 |
| Heptane | 0.010 | 0.038 | 0.120 | 0.340 | 0.960 | 2.50 |

Similar results were obtained for a blend of 85% n-pentane-15% isopentane and for n-hexane. It is clear from these data that equal recoveries of butadiene can be obtained in $C_5$ to $C_7$ paraffin-based slurry media.

Example 10

The rates of complexation of the 1,3-butadiene are approximately 25 to 50 times faster in the liquid phase reaction taking place in the inert diluent slurry than the complexation rate of the 1,3-butadiene in the vapor phase. Reaction rates in the liquid phase obtained as in Example 4 are compared to laboratory captive bed vapor phase studies in Table 10–I.

Captive bed results were obtained by charging a given quantity of activated cuprous chloride adsorbent, usually 100 grams, to the apparatus of Example 1 used for stripping the liquid phase complexed adsorbent. A given flow rate of crude $C_4$ raw material containing approximately 33%, 1,3-butadiene was fed up through the adsorbent at a given temperature controlled by the coolant jacket from a thermocouple immersed in solids bed. The rate of 1,3-butadiene disappearance from the vapor leaving and knowledge of the 1,3-butadiene entering and using an appropriate model of this system a pseudo rate constant was obtained. These data illustrate that considerably smaller reaction equipment can be used when the complexing is conducted in liquid phase.

TABLE 10–I

| | | |
|---|---|---|
| Temperature, °F | 95 | 66 |
| Pseudo First Order Rate [1] Liquid Phase | 25 | 45 |
| Vapor Phase, Captive Bed | 0.53 | 1.1 |

[1] Rate in pound moles 1,3-butadiene complexed/hr., per pound adsorbent, per p.s.i.a. 1,3-butadiene.

Example 11

Adsorbent capacity and complexing activity, functions of adsorbent porosity, are important in determining the quantity of solids needed to remove a given quantity of 1,3-butadiene and in determining the rate at which 1,3-butadiene is removed. As shown in Example 2, 40.8 grams of 1,3-butadiene can theoretically be recovered on 150 grams of sorption-active cuprous chloride adsorbent and is referred to as 100% capacity. This condition is, however, dependent entirely upon the porosity of the cuprous halide and statistical probability of two cuprous halide being available. The degree to which one can approach 100 percent capacity is quite important in determining the recycle rate of the decomplexed cuprous halide to the complexing and/or the recovery of 1,3-butadiene. The capacity of activated adsorbent is materially increased during complexing and decomplexing in the inert diluent system, whereas no significant improvement is realized by complexing and decomplexing in the vapor feed fluid bed or transfer line recovery system.

| Recovery System | Inert n-Pentane Diluent Slurry | Vapor Fluid Bed | Transfer Line |
|---|---|---|---|
| Capacity of Solids, Charged Percent of Theory | 70 | 70 | 70 |
| Capacity of Solids, Discharged, Percent of Theory | 70–85 | ~60 | ~60 |

Furthermore, the complexing activity (a measure at the rate at which 1,3-butadiene is sorbed) of cuprous halide solid adsorbent used in the inert liquid paraffin-based diluent slurry process is improved with use and when compared to similar solids from fluid bed or transfer-line recovery systems shows a distinct advantage. Single cycle (sorption-desorption) results from solids charged (having the same initial complexing activity and complexed in an inert paraffin diluent slurry as in Example 6) show a three to four-fold increase in complexing activity after a single cycle. Additional cycles show no appreciable further improvement nor decrease in activity whereas, in the fluid bed and transfer line studies, no appreciable increase in relative activity of the solids is exhibited over that charged to the system even after many cycles.

Example 12

This example shows the advantages gained by rapid removal of the decomplexed 1,3-butadiene from the decomplexation zone during decomplexation. In these laboratory tests, the loss of solids relative complexing activity was followed while decomplexation was carried out at the noted temperatures.

| | Pentane Slurry | |
|---|---|---|
| | Relative | Complexing Activity, Percent |
| Decomplexing Temperature, °F | 170 | 200 |
| Holding Time, Min.: | | |
| 0 | 1.00 | 0.90 |
| 20 | 0.82 | 0.87 |
| Percent of Original Activity Lost in 20 Min | 18 | 3 |

The effect of 1,3-butadiene concentration on deactivation is shown below showing it is desired to keep this concentration as low as possible during decomplexing by rapid removal of the 1,3-butadiene as it is released.

PENTANE SLURRY, 200° F. DECOMPLEXING

| 1,3-butadiene present, percent | None | 5 |
|---|---|---|
| | Relative | Complexing Activity |
| Holding Time, Min.: | | |
| 0 | 0.9 | 1.00 |
| 20 | 0.87 | 0.59 |

Additional laboratory tests have shown that the rate of decomplexation is retarded by the presence of 1,3-butadiene in the slurry liquid during decomplexation thus requiring longer holding times and larger decomplexing vessels.

What is claimed is:

1. A process for recovering high purity 1,3-butadiene from a hydrocarbon feedstream containing it along with $C_4$ monoolefin and $C_4$ alkane which comprises (1) contacting (A) said feedstream with (B) a liquid slurry containing solid, sorption-active cuprous halide sorbent particles selected from the group consisting of cuprous chloride, cuprous bromide and cuprous iodide and having a porosity above about 10% (of the volume of a particle) 550 to 10,000 A. pores in an essentially anhydrous organic liquid slurry medium containing an extraneous, inert liquid paraffin diluent which (a) is essentially inert to reaction with said cuprous halide sorbent (b) has an atmospheric boiling point higher than 1,3-butadiene, $C_4$ monoolefins and $C_4$ alkane contained in said feedstream, and (c) has an atmospheric boiling point lower than that temperature at which said cuprous halide particles deactivate significantly with the proviso that said paraffin diluent can be one which, per se, has an atmospheric boiling point at or above said deactivation temperature provided that said paraffin diluent is employed in the presence of an inert boiling point depressant which lowers the boiling point of said paraffin diluent to a temperature below said sorbent deactivation temperature, at temperature and pressure conditions sufficient to effect liquid phase formation of a said cuprous halide-1,3-butadiene solid complex preferentially; (2) stripping from said solid complex and liquid slurry medium uncomplexed materials and materials less preferentially complexed than 1,3-butadiene while maintaining a liquid slurry of said solid complex particles in said inert liquid diluent; and (3) desorbing said solid complex particles in the presence of said liquid slurry diluent but substantially in the absence of $C_4$ monoolefins to recover 1,3-butadiene therefrom.

2. A process as in claim 1 wherein said cuprous halide is cuprous chloride.

3. A process as in claim 1 wherein said liquid phase slurry complexing is conducted in a plurality of sequential slurry complexing steps, each succeeding slurry complexing step being conducted at a lower temperature than the preceding slurry complexing step with all complexing steps being conducted in the liquid phase in the presence of said $C_4$ monoolefin and said inert liquid diluent.

4. A process as in claim 1 wherein said inert liquid diluent is a $C_5$ to $C_7$ alkane.

5. A process as in claim 4 wherein said inert liquid diluent is pentane and said stripping (2) is conducted at tower top temperatures of −20 to 50° F. and pressures of 1 to 20 p.s.i.a. and tower bottom temperatures of 10 to 80° F. and pressures of 4 to 30 p.s.i.a.

6. A process as in claim 4 wherein said inert liquid diluent is heptane and said stripping (2) is conducted at tower top temperatures of 50 to 130° F. and pressures of 15 to 80 p.s.i.a. and tower bottom temperatures of 80 to 180° F. and pressures of 17 to 85 p.s.i.a.

7. A process as in claim 1 wherein said inert liquid diluent is a $C_8$ to $C_{12}$ alkane.

8. A process as in claim 1 wherein said complexing takes place in the presence of boiling slurry liquid medium containing $C_4$ monoolefin and wherein the vaporized $C_4$ monoolefin provides cooking to offset at least a substantial portion of heat of complexation generated during complexing.

9. A process as in claim 1 wherein said slurry stripping (2) is conducted at vacuum conditions.

10. A process as in claim 1 wherein an inert gas is employed for stripping during slurry stripping (2).

11. A process as in claim 10 wherein said inert gas contains nitrogen.

12. A process as in claim 10 wherein said inert gas contains a $C_5$ to $C_7$ alkane.

13. A process as in claim 1 wherein a 1,3-butadiene-containing gas is employed for stripping during slurry stripping (2).

14. A process as in claim 3 wherein said liquid phase slurry complexing is conducted in at least three sequential liquid phase slurry complexing steps, the first being conducted at temperatures ranging from 0 to 150° F. and pressures ranging from 5 to 100 p.s.i.a., the second being conducted at temperatures ranging from 0 to 110° F. and pressures ranging from 5 to 70 p.s.i.a. and the third being conducted at temperatures ranging from −20 to 70° F. and pressures of 1 to 30 p.s.i.a.

15. A process as in claim 1 wherein the $C_4$ monoolefin content of said stripped, complexed cuprous halide sorbent solids is <1 wt. percent.

16. A process as in claim 1 wherein said desorption (3) is conducted at temperatures ranging from about 120 to about 240° F., and pressures ranging from about 10 to about 150 p.s.i.a.

17. A process as in claim 1 wherein the desorbed 1,3-butadiene is removed rapidly by stripping it from the region in which it was released.

18. A process as in claim 1 which includes separating 1,3-butadiene from said inert liquid diluent.

19. A process as in claim 1 which includes separating 1,3-butadiene from said liquid slurry containing sorbent solids and said inert liquid diluent and then recycling said sorbent solids-inert liquid diluent slurry to said liquid phase slurry complexing.

20. A process as in claim 1 wherein said liquid slurry medium contains less than 300 p.p.m. water.

21. A process as in claim 1 wherein the concentration of said inert liquid paraffin diluent in said slurry ranges from 40 to 900 wt. percent based on total cuprous halide solids.

22. A process as in claim 1 wherein during said complexing (1) said slurry contains from about 10 to about 65 wt. percent of said cuprous halide solids, based on the total of slurry solids and liquids.

23. A process as in claim 1 wherein a portion of the cuprous halide slurry solids are raw cuprous halide salt selected from the group consisting of cuprous chloride, cuprous bromide and cuprous iodide.

24. A process as in claim 1 wherein the average particle size of said cuprous halide sorbent particles is <400μ.

25. A process as in claim 1 wherein said cuprous halide sorbent purity is 95+%.

26. A process for recovery of high purity 1,3-butadiene from a hydrocarbon feedstream containing it along with butene and butane which comprises (1) contacting
(A) said feedstream with
(B) a liquid slurry containing solid, sorption-active, cuprous chloride sorbent particles having a porosity above about 10% (of the volume of a particle) 550 to 10,000 A. pores in an essentially anhydrous organic liquid slurry medium containing an inert liquid $C_5$ to $C_7$ paraffin diluent at temperature and pressure conditions sufficient to effect liquid phase formation of a solid cuprous chloride-1,3-butadiene complex preferentially; (2) stripping from said solid complex and liquid slurry medium uncomplexed and less preferentially complexed materials than 1,3-butadiene while maintaining a liquid slurry of said solid complex particles in said slurry medium; and (3) desorbing said solid cuprous chloride-1,3-butadiene complex particles in the presence of said inert liquid diluent, but substantially in the absence of $C_4$ monoolefins to recover 1,3-butadiene therefrom.

27. A process as in claim 26 wherein said liquid phase slurry complexing is conducted in at least three sequential slurry complexing steps, each succeeding slurry complexing step being conducted at a lower temperature than the preceding slurry complexing step with all slurry complexing steps being conducted in the liquid phase in the presence of said $C_4$ monoolefins and said $C_5$ to $C_7$ paraffin diluent and wherein the first complexing step is conducted at temperatures ranging from about 80 to about 120° F. and pressures ranging from about 15 to about 70 p.s.i.a., the second complexing step is conducted at temperatures ranging from about 40 to about 100° F. and pressures ranging from about 15 to about 65 p.s.i.a. and the third complexing step is conducted at temperatures ranging from about −10 to about 60° F. and pressures ranging from about 2 to about 20 p.s.i.a.

28. A process as in claim 27 wherein said slurry stripping (2) is conducted at vacuum conditions.

29. A process as in claim 27 wherein said slurry stripping (2) is conducted at conditions allowing some slurry decomplexing of said cuprous chloride sorbent particles to occur thereby providing 1,3-butadiene for stripping.

30. A process as in claim 27 wherein said slurry stripping (2) is conducted at conditions allowing some slurry complexing of said cuprous chloride sorbent particles to occur.

31. A process as in claim 27 wherein said inert liquid paraffin diluent is pentane and said stripping (2) is conducted at tower top temperatures of −20 to 30° F. and pressures of 2 to 10 p.s.i.a. and tower bottom temperatures of 20 to 70° F. and pressures of 4 to 20 p.s.i.a.

32. A process as in claim 27 wherein said inert liquid paraffin diluent is heptane and said stripping (2) is conducted at tower top temperatures of 70 to 120° F. and pressures of 15 to 70 p.s.i.a. and tower bottom temperatures of 120 to 160° F. and pressures of 17 to 75 p.s.i.a.

33. A process as in claim 27 wherein said desorption (3) is conducted at temperatures ranging from about 170 to about 210° F. and pressures ranging from about 15 to about 90 p.s.i.a.

34. A process as in claim 33 which includes separating 1,3-butadiene from said $C_5$ to $C_7$ paraffin diluent at temperatures ranging from about 120 to about 260° F. and pressures ranging from about 1 to about 160 p.s.i.a., and then recycling said cuprous chloride sorbent solids—$C_5$ to $C_7$ paraffin diluent slurry to said liquid phase slurry complexing.

35. A process as in claim 34 wherein said liquid slurry medium contains less than 300 p.p.m. water.

36. A process as in claim 35 wherein the concentration of said $C_5$ to $C_7$ liquid paraffin diluent in said slurry ranges from about 65 to about 120 wt. percent based on total cuprous chloride solids.

37. A process as in claim 35 wherein during said complexing (1) said slurry contains from about 35 to about 60 wt. percent cuprous chloride solids, based on the total of slurry solids and liquids.

38. A process as in claim 35 wherein a portion of the cuprous chloride slurry solids are raw cuprous chloride salt.

39. A process as in claim 35 wherein the average particle size of said cuprous chloride sorbent particles is $<200\mu$.

40. A process as in claim 39 wherein the average particle size of said cuprous chloride sorbent particles is $<100\mu$.

41. A process as in claim 27 wherein the predominant complexation is conducted at temperatures ranging from about 80 to about 120° F. for a sufficient time to insure 90+% approach to equilibrium recovery in this stage.

References Cited
UNITED STATES PATENTS

| | | | |
|---|---|---|---|
| 2,389,647 | 11/1945 | Soday | 260—680 |
| 2,973,396 | 2/1961 | Atkinson et al. | 260—681.5 |
| 2,985,697 | 5/1961 | Cahn | 260—681.5 |
| 3,080,437 | 3/1963 | Scofield et al. | 260—681.5 |
| 3,242,227 | 3/1966 | Kroeper et al. | 260—681.5 |
| 3,206,521 | 9/1965 | Long | 260—681.5 |
| 3,348,908 | 11/1967 | Long et al. | 260—681.5 |
| 3,340,004 | 9/1967 | Hunter et al. | 260—681.5 |

DELBERT E. GANTZ, *Primary Examiner.*

G. E. SCHMITKONS, *Assistant Examiner.*